United States Patent
Hente et al.

(10) Patent No.: US 8,035,309 B2
(45) Date of Patent: Oct. 11, 2011

(54) LIGHT EMITTING DEVICE

(75) Inventors: Dirk Hente, Wurselen (DE); Joseph Hendrik Anna Maria Jacobs, Eygelshoven (NL); Eberhard Waffenschmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 481 days.

(21) Appl. No.: 12/293,299

(22) PCT Filed: Mar. 16, 2007

(86) PCT No.: PCT/IB2007/050909
§ 371 (c)(1),
(2), (4) Date: Sep. 17, 2008

(87) PCT Pub. No.: WO2007/107933
PCT Pub. Date: Sep. 27, 2007

(65) Prior Publication Data
US 2009/0072752 A1    Mar. 19, 2009

(30) Foreign Application Priority Data
Mar. 23, 2006 (EP) .................................. 06111593

(51) Int. Cl.
H05B 37/00 (2006.01)
H05B 39/00 (2006.01)
H05B 41/14 (2006.01)

(52) U.S. Cl. .................... 315/241 R; 315/243; 315/297; 315/307

(58) Field of Classification Search ............... 315/241 R, 315/242, 243, 291, 297, 307, 247, 224
See application file for complete search history.

(56) References Cited

U.S. PATENT DOCUMENTS

| | | | |
|---|---|---|---|
| 5,583,424 A | 12/1996 | Sato et al. | |
| 6,140,902 A | 10/2000 | Yamasawa et al. | |
| 6,201,346 B1 | 3/2001 | Kusaka | |
| 6,351,204 B1 | 2/2002 | Yamasawa et al. | |
| 6,452,576 B1 | 9/2002 | Van Velzen et al. | |
| 7,511,436 B2 * | 3/2009 | Xu .............................. | 315/307 |
| 2002/0125820 A1 | 9/2002 | Sheu | |
| 2002/0125832 A1 | 9/2002 | Yokoyama | |
| 2003/0071821 A1 | 4/2003 | Sundahl et al. | |
| 2004/0130514 A1 | 7/2004 | Yokoyama | |
| 2005/0194894 A1 | 9/2005 | Sato | |

FOREIGN PATENT DOCUMENTS

| | | |
|---|---|---|
| EP | 0492362 A1 | 7/1992 |
| EP | 0717445 A2 | 6/1996 |
| JP | 10055916 A | 2/1998 |
| JP | 2850906 B1 | 1/1999 |
| JP | 2002535722 A | 10/2002 |
| WO | 8605304 A1 | 9/1986 |
| WO | 2007013001 A2 | 2/2007 |

* cited by examiner

*Primary Examiner* — Daniel D Chang

(57) ABSTRACT

A light emitting device includes an electronic driver and a planar light emitting element. The driver is connected with a source and the light emitting element, where the light emitting element has an internal capacitance and is connected to the driver in such a way that the internal capacitance serves as a passive output filter of the driver.

9 Claims, 3 Drawing Sheets

LIGHT EMITTING DEVICE

Figure 1:
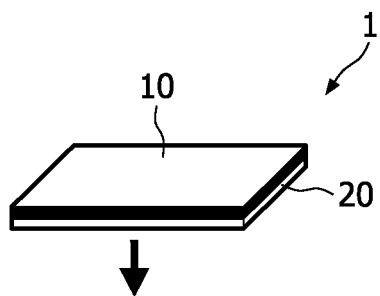

This invention relates to a light emitting device with a driver and a planar light emitting element with internal capacitance.

It is known that the integration of passive filters is a key technology for highly integrated electronic circuits, because the passive filters typically need more than ⅔ of the space of conventional circuits. It is especially necessary for applications, which need an ultra thin building height such as thin, flat displays (plasma display, LCD-displays etc). In a plurality of known electrical devices, such as mobile communication devices, voltages are required that differ from a DC-voltage provided for example from a battery. To convert the voltage efficiently, especially passive filters like capacitors and inductors are used. For example thin surface mounted (SMT) inductors are used. Such SMT inductors are usually provided with plastic fixtures with contacts to mount with the device to a printed circuit board (PCB).

EP 05106924.3 discloses a light emitting device with a sealing integrated driver having a multilayer structure, in which the passive filters are completely integrated. Flat drivers with integrated passive filters consisting of LC (L for inductor, C for capacitor) combinations in order to filter disturbances are achieved.

The invention has for its object to improve the above mentioned light emitting device. In particular, it is an object of the present invention to provide a light emitting device with a reduced thickness.

This object is achieved by a light emitting device as taught by claim 1 of the present invention.

Accordingly, a light emitting device with a driver and a planar light emitting element is provided. The driver adapts the available supply voltage to the required current of the light emitting element. The driver is connected with a source and the light emitting element, wherein the light emitting element having an internal capacitance is connected to said driver in such a way that the internal capacitance serves as a passive output filter of the driver.

One of the essential ideas of this invention is based on the fact, that the internal capacitance of the light emitting element is utilized enabling the elimination or reduction of the passive output filter of the driver, which comprises an electronic driver circuit. In this way, a light emitting device system with optimized form factor using a flat driver can be achieved. The elimination or reduction of the output capacitance reduces the number of components of the driver or its volume and weight. Subsequently, a high power density, low manufacturing costs and an increased reliability are achieved.

Preferably, the internal capacitance serves as a part of the output filter of the driver. In a preferred embodiment of the light emitting device, the passive output filter of the driver is an inductor and/or a capacitor. Advantageously, the driver being flat shaped comprises a multilayer structure, wherein the inductor comprises a substrate with a first and a second side, a winding and a soft-magnetic core, wherein the winding is embedded in the substrate, wherein the core comprises a first soft-magnetic sheet which is arranged on the first side of the substrate and a second soft-magnetic sheet which is arranged on the second side of the substrate such that the winding is at least partially covered by the first soft-magnetic sheet and the second soft-magnetic sheet. Thus, a very thin driver with integrated windings can be provided. Furthermore, the driver according to this exemplary embodiment of the present invention has a simple design, which can be manufactured at reduced cost. No specially shaped drum core needs to be provided. This makes the driver according to the present invention suitable for mass manufacturing. Also, advantageously, this inductor is very reliable due to the fact that its magnetic core consists of soft-magnetic sheets provided on the substrate. Increased reliability may also be provided due to the fact that no soldering connections between the inductor and the substrate are necessary.

According to a preferred embodiment of the present invention, an insulating layer is provided between the first soft-magnetic sheet and the first side of the substrate and between the second soft-magnetic sheet and the second side of the substrate. The soft-magnetic sheets can be made of a high permeable metal such as μ-metal, amorphous metal or nanocristaline metal. Furthermore, materials like ferrite Polymer Compounds (FPC), powder iron cores or sintered ferrite sheets are possible. The thickness of the metal sheets can be very thin such as in the range of 20 μm to 500 μm.

According to the preferred embodiment of the present invention the light emitting element is an Organic Light Emitting Diode (OLED). The OLED is large area device, with extremely thin organic layers. Therefore, the internal capacitance of said OLED is relatively large. The internal capacitance is in the range of 10 $pF/mm^2$ to 1000 $pF/mm^2$. As a result, at least an essential reduction of the output capacitance of the driver can be achieved. The key differentiating benefit of an OLED is a form factor being very thin and flat. Preferably, the driver is connected to the back of said OLED. In the functional result of the invention, the technical fact that an OLED can be made bendable or flexible in itself can be used to distinguish this feature by constructing a driver, which is just as bendable or flexible as the OLED. So, the complete light emitting device finally becomes bendable or flexible, which is a great advantage for a high number of possible technical applications. The combination of a flat construction and a high flexibility result in a very flat and effective device.

The capacitance in combination with the on-state characteristic of the OLED results in a self-discharge with a time constant $\tau_{OLED}$, which is in the range of approximately 50 ns to 25 μs. Hereby, the OLED driver can be a switched mode power supply to obtain a high efficiency. The driver can be mounted on the back of the OLED achieving an excellent form factor. A further advantage of the invention is that a lamp covering a large area consists of one large tile or a number of small cells. This invention allows equipping each single OLED tile with one flat driver or each OLED cell with its own flat driver. These cells can be connected in parallel, in series or in combination of both.

Preferably, the light emitting element, the driver and his elements are created so thinly, that they are bendable or flexible. Advantageously, the invention can be applied to many different topologies. Advantageously, the driver comprises a DC-to-DC converter. For a supply voltage, which is higher than the diode voltage of the OLED, a step-down converter with current control can be applied. For a supply voltage, which is lower than the diode voltage, a step-up converter with current control can be applied. For a high difference between supply voltage and diode voltage, a fly-back converter with an integrated transformer could be used. Other possible converters like buck-boost converter, forward converter, SEPIC converter, Cùk converter, push-pull converter, half-bridge converter, full-bridge converter or resonant converter can be applied. Each converter can be equipped with a control stage such that the output of each OLED cell can be individually controlled. This is important for dimming and colour control using invention-related OLEDs. Said flat driver comprises passive output filter to reduce the output voltage and current ripple. The capacitances and the inductances in combination with the switching frequency of the OLED driver determine the voltage ripple. This means that for a given switching frequency the output capacitive filter or inductive/capacitive filter can be designed in such a way that the maximum allowable voltage ripple is not exceeded. It has been found out that high switching frequencies enable elimination of the output capacitance by utilization of the internal OLED capacitance. These frequencies depend on the lighting device that is used. For lower switching frequencies, the output capacitance cannot be removed completely, but a part of it. In this way, a high power density driver with excellent form factor is realized.

The light emitting device according to the present invention can be used in a variety of systems amongst them systems being household application systems, shop lighting systems, home lighting systems, accent lighting systems, spot lighting systems, fibre-optics application systems, projection systems, self-lit display systems, segmented display systems, warning sign systems, medical lighting application systems, mobile phone display systems, indicator sign systems, decorative lighting systems or electronic systems in a flexible environment, such as textiles and other wearables.

The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

Additional details, characteristics and advantages of the object of the invention are disclosed in the following description of the respective figures—which in an exemplary fashion—shows preferred embodiments of the light emitting device according to the invention.

Figure 2:
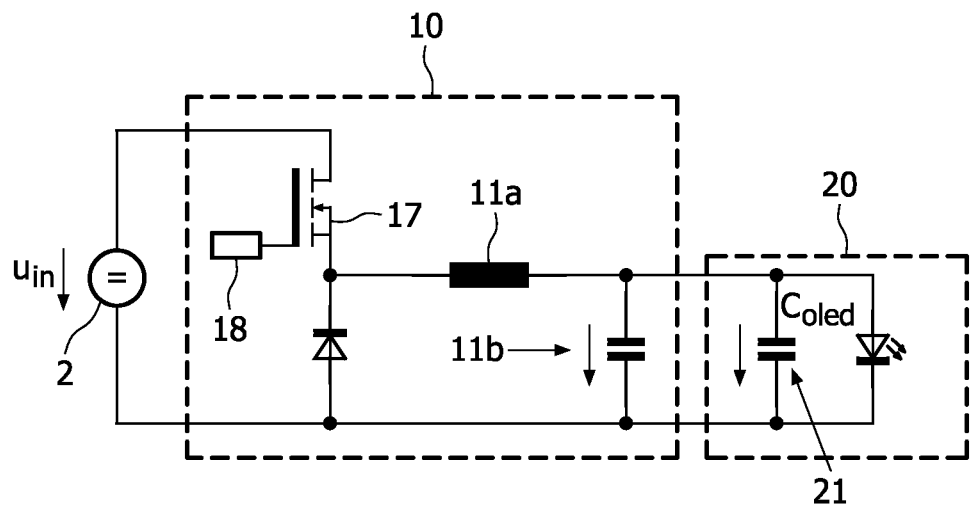
Figure 3:
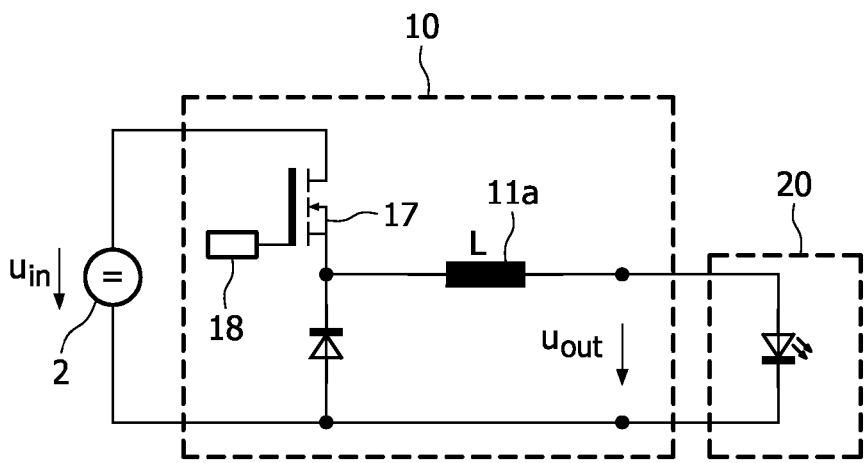
Figure 4:
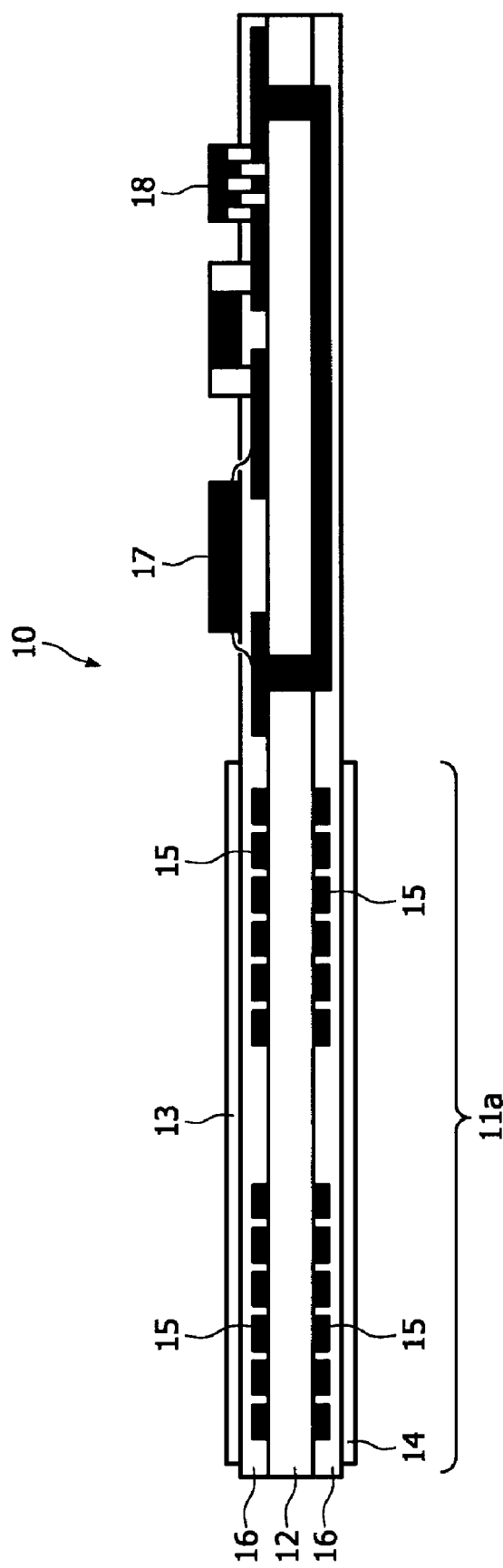

FIG. 1 shows a very schematic view of a light emitting device according to a first embodiment of the present invention, FIG. 2 shows an embodiment of a light emitting device including its driver, FIG. 3 shows another embodiment of a light emitting device including its driver, FIG. 4 shows a very schematic view of a driver for the inventive light emitting device and FIG. 5 shows possible connections of the driver with the OLED of the light emitting device.

FIG. 1 illustrates a light emitting device 1 with a driver 10 and a planar light emitting element 20. Said light emitting device 1 emits light to the bottom. According to the shown embodiment the planar light emitting element 20 is an OLED. The complete light emitting device 1 may consist of flexible/bendable layers arranged in layers.

FIG. 4 shows a possible embodiment of said driver 10. The driver 10 is flat shaped comprising a multilayer structure. Further, the driver 10 has one passive output filter 11a in order to adapt the available supply voltage to the required current of the light emitting element 20. The output filter 11a is an inductor 11a comprising a substrate 12 with a first and a second side. Within the substrate 12 there are provided two windings 15. The windings 15 are embedded in the substrate 12 and thus form an integral part of the substrate 12. A core of the inductor 11a is formed by soft-magnetic metal sheets 13, 14 arranged on the first and the second sides of the substrate 12 such that the windings 15 are at least partially covered by the soft-magnetic sheets 13, 14.

The substrate 12 is a flexible substrate, such as a flex foil, and due to the fact that soft-magnetic sheets 13, 14 are used and not sintered ferrites as known in the art, a bendable and flexible inductor 11a can be provided. The flexibility is furthermore improved by the fact that the magnetic core, i.e. the soft-magnetic sheets 13, 14 have very small thickness.

As illustrated in FIG. 4 an insulating layer 16 is provided between the first soft-magnetic sheet 13 and the first side of the substrate 12 and between the second soft-magnetic sheet 14 and the second side of the substrate 12. The windings 15 are integrated in the flexible polyimide substrates. The inductor windings 15 are made as spiral windings from copper layers laminated to the substrate 12. In order to improve an adhesion of the soft-magnetic sheets 13, 14 to the surfaces of the flex foil 12, the soft-magnetic sheets 13, 14 can be silicated on the respective surface to be laminated to the substrate 12. On the right side of the shown driver 10 of FIG. 4 further electronic components like a controller 18 and a mosfet 17 are illustrated.

FIG. 2 shows an embodiment of the light emitting device 1, wherein the driver 10 is connected with a source 2 and the OLED 20. The driver 10 comprises a mosfet 17, which is connected with a controller 18. In addition, the driver 10 comprises one passive output filter 11a as an inductor 11a and a second passive output filter 11b as a capacitor. The driver 10 is connected with the OLED. In operation of the light emitting device 1, the internal capacitance 21 serves as an additional passive filter. Advantageously, using the internal capacitance 21 of the OLED 20 a reduction of the output filter capacitance 11b of said driver 10 can be reduced dramatically. In this way, the light emitting device 1 with optimized form factor, thin, flat and/or flexible using said driver 10 can be achieved.

FIG. 3 shows another embodiment of the present invention, wherein the output filter capacitance of said driver 10 can be completely eliminated.

In this case, said driver 10 comprises only one passive output filter 11a, which is an inductor 11a. Like in FIG. 2 the driver 10 is connected with source 2 and the OLED 20. The amount of the internal capacitance of the OLED 20, which is not shown explicitly in FIG. 3, is sufficient to eliminate completely the passive output capacitance of the driver 10.

Figure 5A:
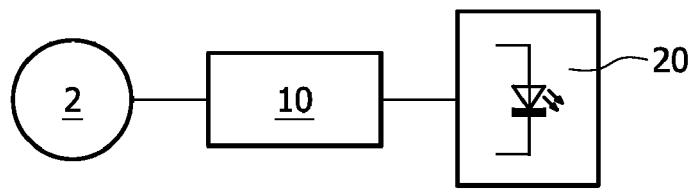
Figure 5B:
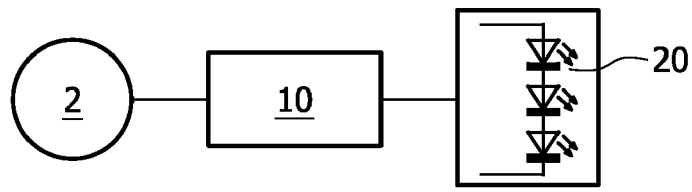
Figure 5C:
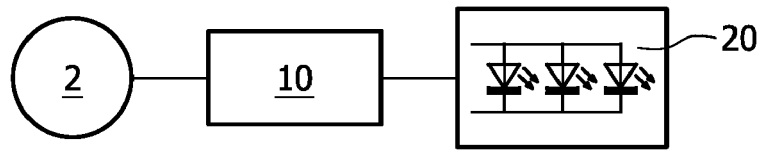
Figure 5D:
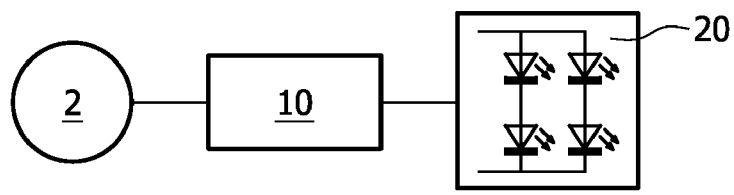
Figure 5E:
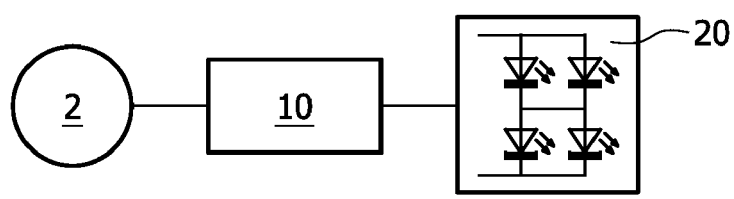

The driver 10 feeds the OLED 20, which can be a single OLED 20, a string or series connected OLEDs 20 (FIG. 5b), a stag of parallel-connected OLEDs (FIG. 5c) or a network of OLEDs 20 (FIG. 5d and FIG. 5e). The series and parallel connection of OLEDs 20 does not change the over-all time-constant significantly. Preferably, the OLED 20 is supplied by DC voltage or current. Therefore, the driver 10 converts the source voltage or current into a regulated DC voltage or current.

| LIST OF NUMERALS | |
|---|---|
| 1 | light emitting device |
| 2 | source |
| 10 | driver |
| 11a | passive output filter, inductor |
| 11b | passive output filter, capacitor |
| 12 | substrate |
| 13 | first soft-magnetic sheet |
| 14 | second soft-magnetic sheet |
| 15 | winding |
| 16 | insulating layer |
| 17 | mosfet |
| 18 | controller |
| 20 | light emitting element, OLED |
| 21 | internal capacitance of light emitting element |

The invention claimed is:

1. A light emitting device comprising:
a driver; and a planar organic light emitting element having an internal capacitance, wherein the driver is connected with a source and the planar organic light emitting element, and wherein the planar organic light emitting element is connected to said driver in such a way that the internal capacitance of the planar organic light emitting serves as at least as part of a passive output filter of the driver.

2. The light emitting device according to claim 1, wherein the driver is flat shaped and comprises a multilayer structure.

3. The light emitting device according to claim 1, further comprising an inductor and a further capacitor arranged at least on one layer of said driver, wherein an insulating layer is provided between the inductor and the further capacitor.

4. The light emitting device according to claim 1, wherein the driver is connected to a back of the planar organic light emitting element.

5. The light emitting device according to claim 1, wherein the planar organic light emitting elements are a string of series connected light emitting elements, a stack of parallel connected light emitting elements or a network of light emitting elements.

6. The light emitting device according to claim 1, wherein the planar organic light emitting element and the driver are bendable or flexible.

7. The light emitting device according to claim 1, wherein the internal capacitance is in a range of 10 pF/mm$^2$ to 1000 pF/mm$^2$.

8. A light emitting device comprising:
a driver; and
a planar light emitting element,
wherein the driver is connected with a source and the light emitting element,
wherein the light emitting element having an internal capacitance is connected to said driver in such a way that the internal capacitance serves as a passive output filter of the driver comprising an inductor and the internal capacitance,
wherein the inductor comprises a substrate with a first and a second side, a winding and a soft-magnetic core, and
wherein the winding is embedded in the substrate, wherein the core comprises a first soft-magnetic sheet which is arranged on the first side of the substrate and a second soft-magnetic sheet which is arranged on the second side of the substrate such that the winding is at least partially covered by the first soft-magnetic sheet and the second soft-magnetic sheet.

9. The light emitting device as claimed in claim 8, further comprising an insulating layer between the first soft-magnetic sheet and the first side of the substrate and between the second soft-magnetic sheet and the second side of the substrate.

* * * * *